(12) United States Patent
Smith et al.

(10) Patent No.: US 11,530,044 B2
(45) Date of Patent: Dec. 20, 2022

(54) USING FOAM FOR STRUCTURAL COMPONENTS OF A SEAT ASSEMBLY

(71) Applicant: Safran Seats USA LLC, Gainesville, TX (US)

(72) Inventors: Jason K. Smith, Denton, TX (US); Raul G. Reyes, Denton, TX (US); Andrew B. Severance, Fort Worth, TX (US)

(73) Assignee: Safran Seats USA LLC, Gainesville, TX (US)

( * ) Notice: Subject to any disclaimer, the term of this patent is extended or adjusted under 35 U.S.C. 154(b) by 420 days.

(21) Appl. No.: 16/332,580

(22) PCT Filed: Sep. 20, 2016

(86) PCT No.: PCT/US2016/052621
§ 371 (c)(1),
(2) Date: Mar. 12, 2019

(87) PCT Pub. No.: WO2018/056949
PCT Pub. Date: Mar. 29, 2018

(65) Prior Publication Data
US 2021/0284342 A1    Sep. 16, 2021

(51) Int. Cl.
*B64D 11/06* (2006.01)
*B60N 2/70* (2006.01)
*A47C 7/50* (2006.01)

(52) U.S. Cl.
CPC ............ *B64D 11/0647* (2014.12); *A47C 7/50* (2013.01); *B60N 2/7035* (2013.01); *B64D 11/0643* (2014.12); *B64D 11/0648* (2014.12)

(58) Field of Classification Search
CPC .. B64D 11/0647; B60N 2/686; B60N 2/7035; B60N 2/646; A47C 7/50; A47C 1/034
See application file for complete search history.

(56) References Cited

U.S. PATENT DOCUMENTS 2,545,679 A      3/1951  Germain
3,612,607 A  * 10/1971  Lohr ........................ A47C 7/18
                                                  297/452.27
(Continued)

FOREIGN PATENT DOCUMENTS

DE        202020104711 U1  *  8/2020  ............. B60N 2/682
KR          20110005545 A  *  1/2011
(Continued)

OTHER PUBLICATIONS

International Patent Application No. PCT/US2016/052621, International Search Report and Written Opinion, dated Mar. 16, 2017.
(Continued)

*Primary Examiner* — Timothy J Brindley
(74) *Attorney, Agent, or Firm* — Kilpatrick Townsend & Stockton LLP

(57) ABSTRACT

Seat assemblies (200) including structural components (212, 222, 232) made of foam are described. A seat sub-assembly (210, 220, 230) can include a frame (214, 224, 234) and a foam support (212, 222, 232). The foam support (212, 222, 232) can be coupled to the frame (214, 224, 234) for receiving a load on the seat sub-assembly (210, 220, 230), dissipating at least half of the load, and dispersing the load through the frame (214, 224, 234).

7 Claims, 6 Drawing Sheets

(56) References Cited

U.S. PATENT DOCUMENTS

| | | | |
|---|---|---|---|
| 4,088,367 A | | 5/1978 | Atkinson et al. |
| 4,264,103 A | | 4/1981 | Peresada et al. |
| 4,332,419 A | | 6/1982 | Vogel |
| 4,405,681 A | * | 9/1983 | McEvoy .................. A47C 7/18 |
| | | | 428/309.9 |
| 4,738,809 A | * | 4/1988 | Storch .................. B29C 33/126 |
| | | | 264/161 |
| 4,784,437 A | * | 11/1988 | Shimada .................. B60N 2/70 |
| | | | 297/452.27 |
| 6,571,411 B1 | * | 6/2003 | Ebe ...................... B60N 2/3011 |
| | | | 297/452.27 |
| 8,695,136 B2 | * | 4/2014 | Pozzi ...................... B60N 2/70 |
| | | | 5/653 |
| 8,696,067 B2 | * | 4/2014 | Galbreath .............. B60N 2/686 |
| | | | 297/452.1 |
| 2016/0107752 A1 | * | 4/2016 | Palmer .................... A47C 7/18 |
| | | | 267/143 |
| 2020/0238658 A1 | * | 7/2020 | Cabouillet ............. B60N 2/686 |

FOREIGN PATENT DOCUMENTS

| | | | | |
|---|---|---|---|---|
| WO | 2006102751 | | 10/2006 | |
| WO | 2013096985 | | 7/2013 | |
| WO | 2013144622 | | 10/2013 | |
| WO | WO-2016171138 A1 | * | 10/2016 | ............... A47C 7/38 |
| WO | WO-2020221809 A1 | * | 11/2020 | ........... B60N 2/7011 |

OTHER PUBLICATIONS

European Patent Application No. 16778545.0, Communication pursuant to Article 94(3) EPC, dated Feb. 5, 2021.

European Patent Application No. 16778545.0, Communication under Rule 71(3) EPC (allowance notification), dated Jun. 17, 2022, 7 pages.

Europe Patent Application No. 16778545.0, Decision to Grant, dated Oct. 7, 2022.

* cited by examiner

USING FOAM FOR STRUCTURAL COMPONENTS OF A SEAT ASSEMBLY

TECHNICAL FIELD

The present disclosure relates generally to using foam for structural components, more particularly (although not necessarily exclusively), to using foam for structural components of a seat assembly.

BACKGROUND

Passenger vehicles, such as aircraft, buses, trains, ships, and automobiles, can include seat assemblies for passengers to sit on and use during travel. Components of a seat assembly can include a frame, a load-bearing structure positioned within the frame, and a comfort cushioning positioned on the load-bearing structure. The load-bearing structure can include a layer of sheet metal, a plurality of beams that can be spread apart by a spreader, or a composite material.

FIG. 1 is a perspective view of a prior art seat assembly 100 that uses a dedicated load-bearing structure. The seat assembly 100 includes a seat pan 110, a seat back 120, and a leg rest 130. The seat pan 110 includes a bottom support 112 positioned within a bottom frame 114. The seat back 120 is pivotally coupled to a rear portion of the seat pan 110 and includes a back support 122 positioned within a back frame 124. The leg rest 130 is pivotally coupled to a front portion of the seat pan 110 and includes a leg support 132 positioned within a leg frame 134.

The bottom support 112, back support 122, and leg support 132 are load-bearing structures for receiving a load from a passenger sitting in the seat assembly 100 and dispersing the load through the bottom frame 114, back frame 124, and leg frame 134. The bottom support 112, back support 122, and leg support 132 may be formed of materials including but not limited to metal and composites. Although not depicted in FIG. 1, a separate cushion can be coupled to the bottom support 112, back support 122, and leg support 132 for providing comfort to the passenger.

The load-bearing structures and comfort cushioning can each add weight to the passenger vehicle, which can increase the cost for operating the passenger vehicle. Additionally, passenger vehicle can have weight limitations, and the added weight of the load-bearing structures and comfort cushioning can restrict the use of other features, components, passengers, or payloads. Accordingly, there is still a need for seat assemblies that provide support and comfort at a lower weight.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments of the present disclosure, a seat sub-assembly can include a frame and a foam support. The foam support can be coupled to the frame for receiving a load on the seat sub-assembly. The foam support can dissipate at least half of the load and disperse a portion of the load through the frame.

In some embodiments, the seat sub-assembly can be a seat back for a seat assembly on a passenger aircraft. The frame can include a first segment and a second segment extending from a seat bottom of the seat assembly. The frame can include a third segment coupled to the first segment and the second segment to define a back-receiving area. The foam support can be positioned within the back-receiving area to support a back of a passenger sitting in the seat assembly. The load can include a weight of the passenger sitting in the seat assembly.

In some embodiments, the seat sub-assembly can be a seat bottom for a seat assembly on a passenger aircraft. The frame can include four segments positioned to define a sitting area. The foam support can be positioned within the sitting area to support a passenger sitting in the seat assembly. The load can include a weight of the passenger sitting in the seat assembly.

In some embodiments, the seat sub-assembly can be a leg rest for a seat assembly on a passenger aircraft. The frame can include four segments positioned to define a leg-rest area. The foam support can be positioned within the leg-rest area for supporting legs of a passenger sitting in the seat assembly. The load can include a weight of the passenger sitting in the seat assembly.

In some embodiments, the foam support can include a foam structural layer, a foam comfort layer, and a covering. The foam structural layer can be for dissipating the load. The foam comfort layer can be coupled to the foam structural layer for providing a cushion. The covering can encompass the foam structural layer and the foam comfort layer to provide protection to the foam structural layer and the foam comfort layer.

In some embodiments, the frame can be encompassed by the foam structural layer.

In some embodiments, the foam structural layer can include a reinforcing grid having a series of ridges and gaps such that the foam structural layer provides greater support to an area of the seat sub-assembly closer to the ridges than the gaps.

In some embodiments, the foam structural layer can include at least one of neopor, polyolefin, ethylene-vinyl acetate ("EVA"), polyethylene, polyform, polyurethane, or ethafoam.

In some embodiments, the foam support can be a structural foam that is molded, machined, formed, or otherwise constructed to act as a load-bearing part of the seat sub-assembly.

In some embodiments, the foam can be used as a replacement for metal load-bearing components that support cushions.

According to certain aspects of the present disclosure, a seat assembly can include a seat pan, a seat back, and a leg rest. The seat pan can include a bottom frame and a bottom support. The bottom support can be coupled to the bottom frame for bearing at least half of a first load on the seat assembly and dispersing a portion of the first load across the bottom support to the bottom frame. The seat back can be coupled to the seat pan and the seat back can include a back frame and a back support. The back support can be coupled to the back frame for bearing at least half of a second load on the seat assembly and for dispersing a portion of the second load across the back support to the back frame. The leg rest can be coupled to the seat pan and the leg rest can include a leg frame and a leg support. The leg support can be coupled to the leg frame for bearing at least half of a third load on the seat assembly and for dispersing a portion of the third load across the leg support to the leg frame. At least one of the bottom support, the back support, or the leg support can include a load-bearing foam.

In some embodiments, the seat assembly can be a passenger seat on a passenger aircraft. The first load, the second load, and the third load can include a weight of a passenger sitting in the passenger seat.

In some embodiments, the load-bearing foam can include a foam structural layer, a foam comfort layer, and a covering. The foam structural layer can be for dissipating the first load, the second load, or the third load. The foam comfort layer can be coupled to the foam structural layer for providing a cushion. The covering can encompass the foam structural layer and the foam comfort layer to protect the foam structural layer and the foam comfort layer.

In some embodiments, at least one of the bottom frame, the back frame, or the leg frame can be encompassed by the foam structural layer.

In some embodiments, the foam structural layer can include a reinforcing grid having a series of ridges and gaps such that the foam structural layer provides greater support to an area of the seat assembly closer to the ridges than the gaps.

In some embodiments, the load-bearing foam can be a structural foam that is molded, machined, formed, or constructed to act as a load-bearing part of the seat assembly.

According to certain aspects of the present disclosure, a method can include assembling a frame for a component of a seat assembly. The method can further include generating a foam support capable of supporting at least half of a load exertable on the component. The method can further include coupling the foam support to the frame to allow the foam support to disperse a portion of the load through the frame.

In some embodiments, the seat assembly can be a passenger seat on a passenger aircraft, wherein generating the foam support comprises at least one of molding, machining, forming, or constructing a structural foam that includes a foam structural layer to act as a load-bearing part of the passenger seat and a foam comfort layer for providing a cushion to a passenger seated in the seat assembly.

Various implementations described in the present disclosure can include additional system, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

Figure 1:
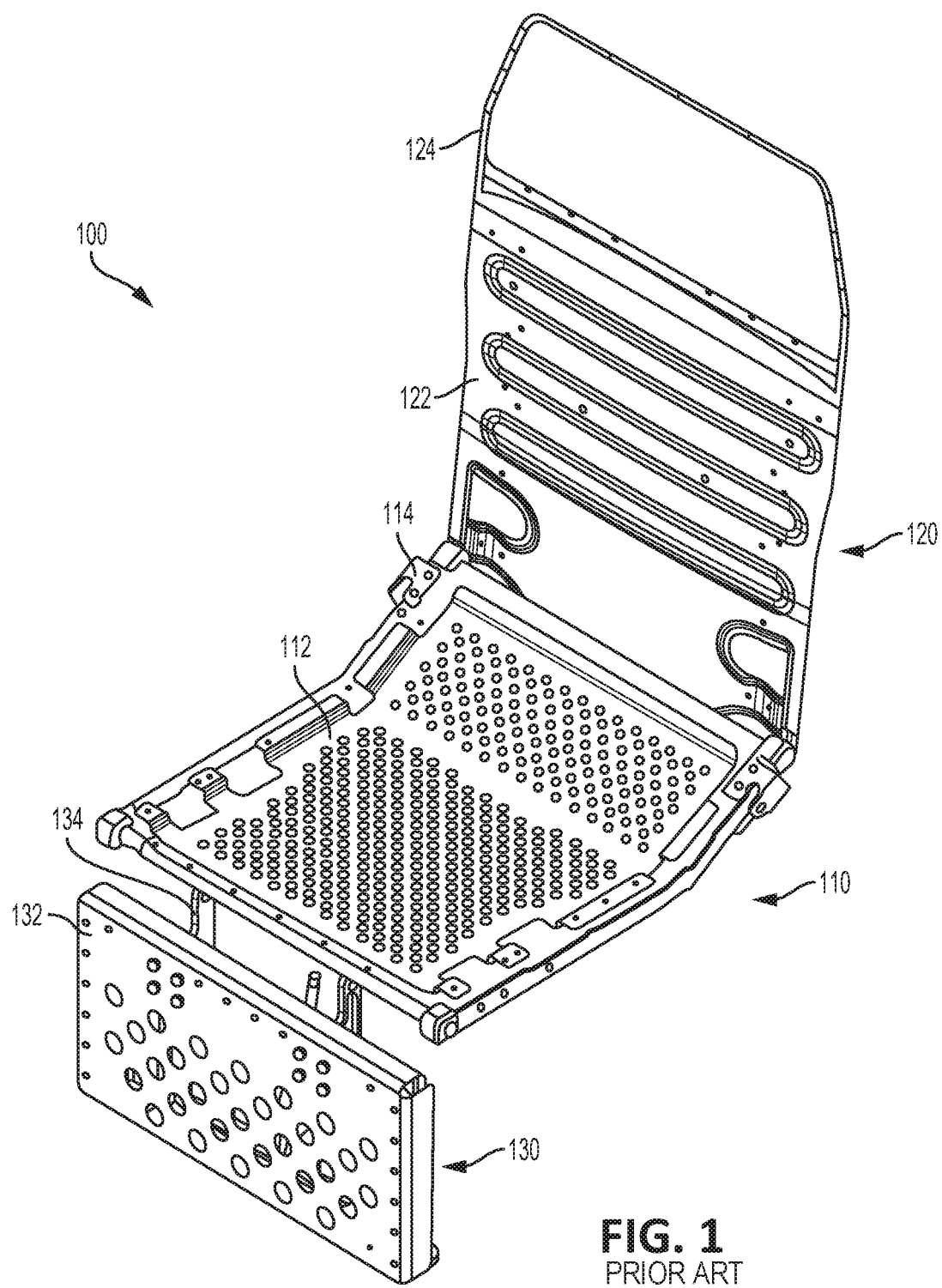
FIG. 1 is a perspective view of an example of a seat assembly, according to the prior art.
Figure 2:
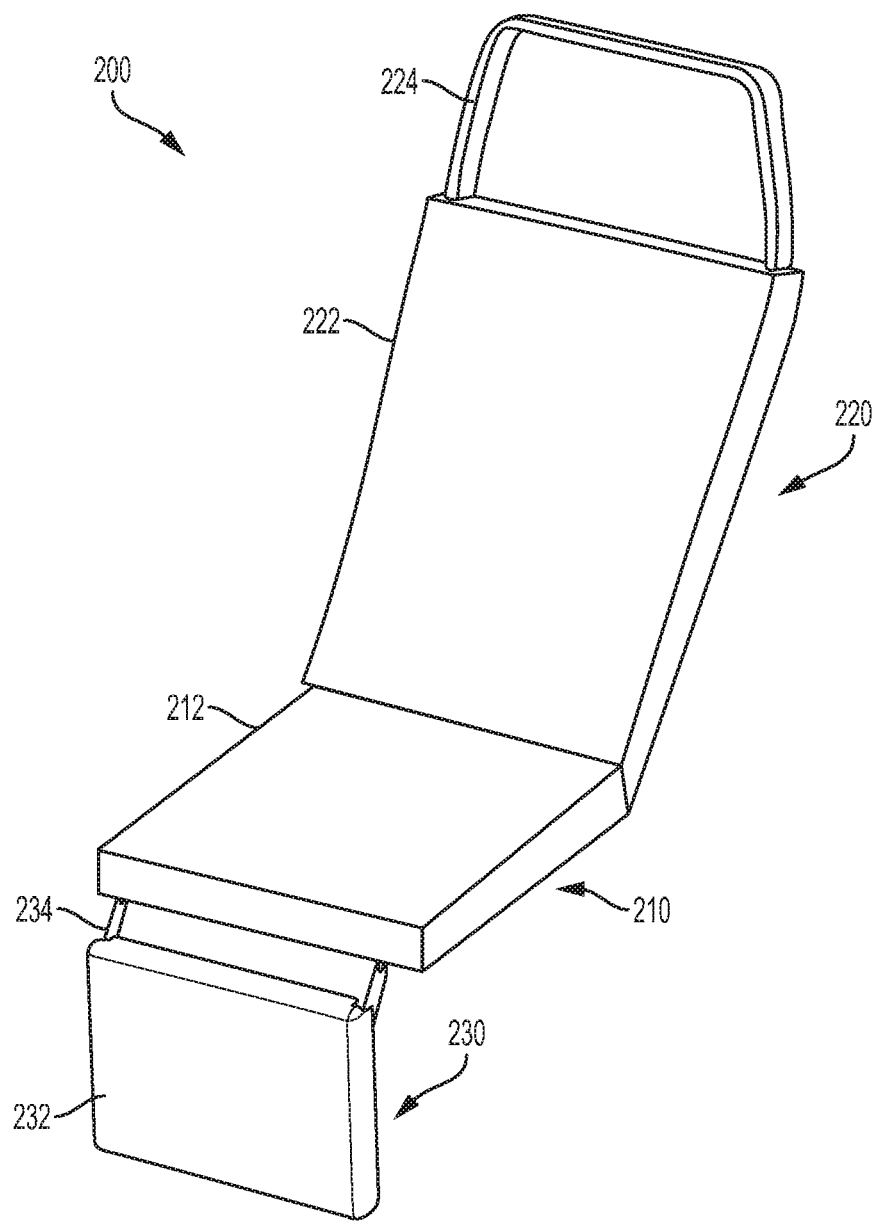
FIG. 2 is a perspective view of an example of a seat assembly with foam structural components, according to one aspect of the present disclosure.
Figure 3A:
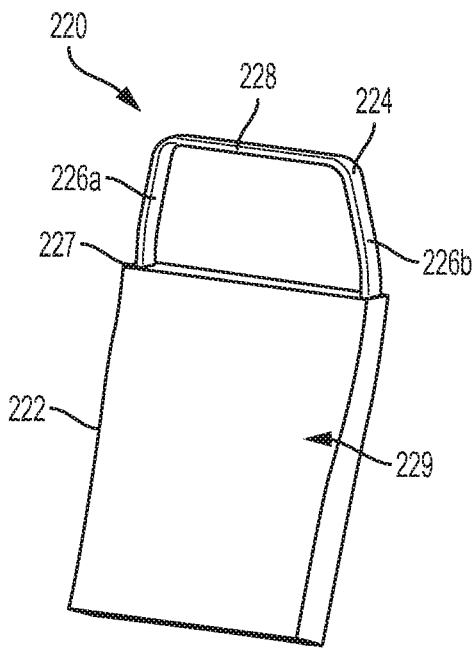
FIG. 3A is a perspective front view of an example of a seat back with a foam structural component according to one aspect of the present disclosure.
Figure 3B:
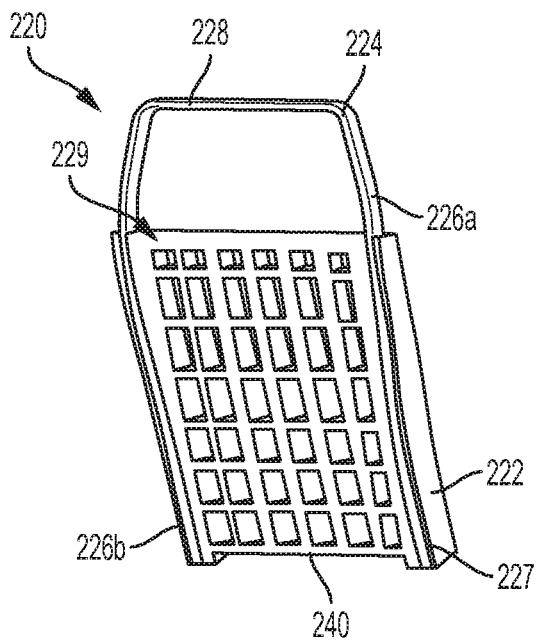
FIG. 3B is a perspective back view of an example of a seat back with a foam structural component according to one aspect of the present disclosure.
Figure 4A:
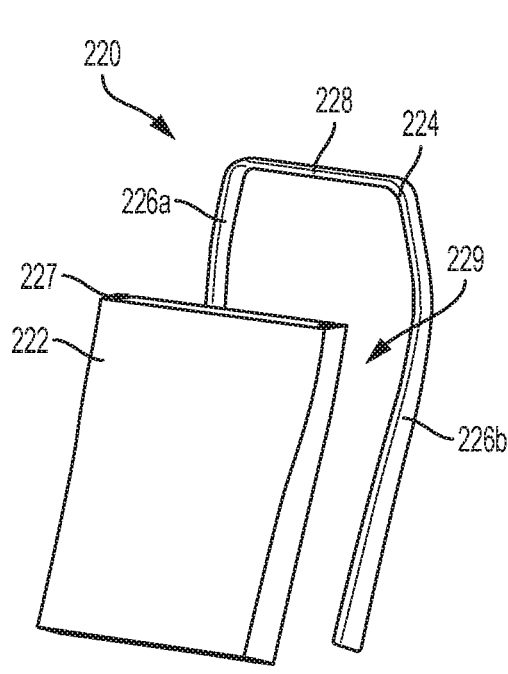
FIG. 4A is an exploded perspective front view of an example of a seat back with a foam structural component according to one aspect of the present disclosure.
Figure 4B:
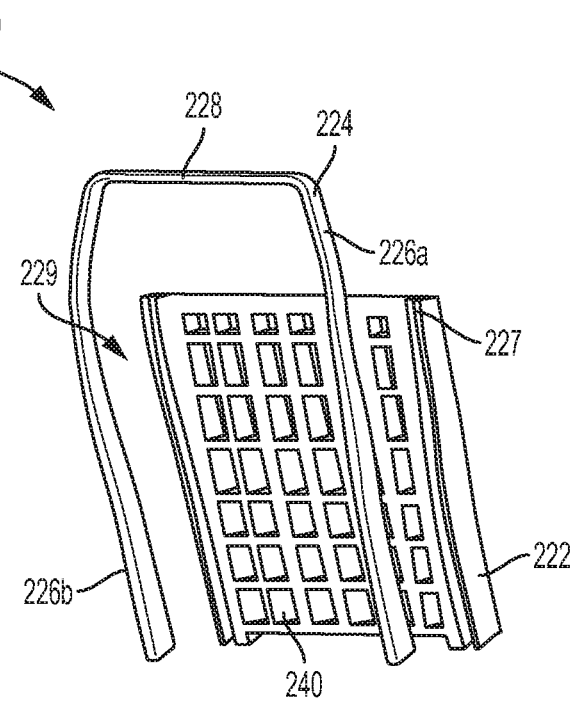
FIG. 4B is an exploded perspective back view of an example of a seat back with a foam structural component according to one aspect of the present disclosure.
Figure 5A:
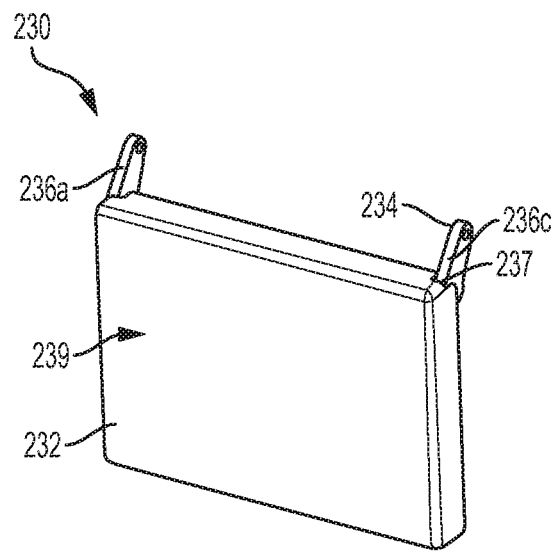
FIG. 5A is a perspective front view of an example of a leg rest with a foam structural component according to one aspect of the present disclosure.
Figure 5B:
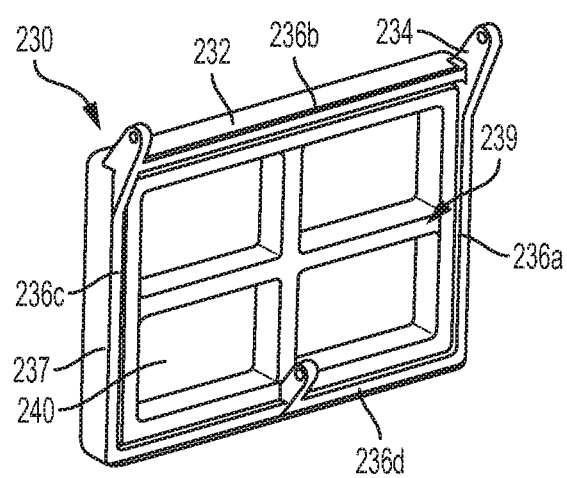
FIG. 5B is a perspective back view of an example of a leg rest with a foam structural component according to one aspect of the present disclosure.
Figure 6A:
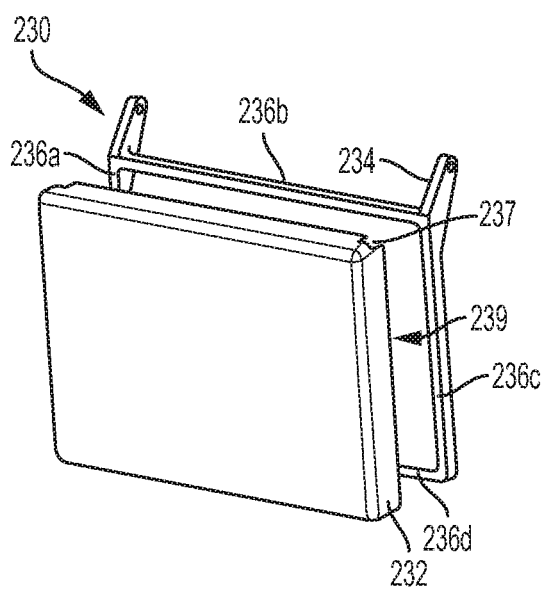
FIG. 6A is an exploded perspective front view of an example of a leg rest with a foam structural component according to one aspect of the present disclosure.
Figure 6B:
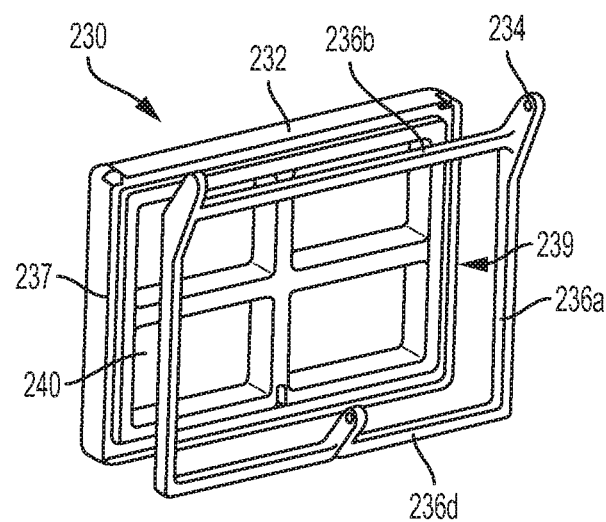
FIG. 6B is an exploded perspective back view of an example of a leg rest with a foam structural component according to one aspect of the present disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In some embodiments, foam can be used for structural components of a seat assembly in an aircraft, but is by no means limited to aircraft seat assemblies. A seat assembly can include any passenger seat and the foam can be used for structural components in any seat assembly or any other seat of any type or otherwise as desired. For example, embodiments may be used on trains, busses, in movie theaters, student seating, desk chairs, couches or any instance where reducing a weight of a seat assembly or combining a structural layer and comfort layer be useful.

According to certain embodiments of the present disclosure, as shown in FIGS. 2-8, a seat assembly 200 uses foam for load-bearing structural components of a passenger seat for an aircraft. The seat assembly 200 can include a seat pan 210, seat back 220, and a leg rest 230. The seat pan 210 can include a foam bottom 212 positioned within a bottom frame 214. The seat back 220 can be pivotally coupled to the seat pan 210 and can include a foam back 222 positioned within a back frame 224. The leg rest 230 can be pivotally coupled to a front portion of the seat pan 210 and can include a foam body 232 positioned within a leg frame 234. The foam bottom 212, foam back 222, and foam body 232 can have a comfort layer 218a and a structural layer 218b, as best illustrated in FIGS. 7A-7B. The foam bottom 212, foam back 222, and foam body 232 can have a reinforcing structure 240.

The foam bottom 212, foam back 222, and foam body 232 can be made of any suitable structural foam including, but not limited to, neopor, polyolefin, ethylene-vinyl acetate ("EVA"), polyethylene, polyform, polyurethane, and ethafoam.

The foam bottom 212, the foam back 222, and the foam body 232 can replace both metallic load-bearing supports and their associated cushions to reduce a total weight of seat assembly 200. The bottom frame 214, the back frame 224, and the leg frame 234 can be made of any suitable material including, but not limited to, metals (e.g., aluminum and titanium), plastics (e.g., polypropylene), or a composite material.

As illustrated in FIGS. 3A-4B, the back frame 224 can include a first segment 226a and a second segment 226b for extending from a seat pan 210 of the seat assembly 200, and a third segment 228 for coupling the first segment 226a and the second segment 226b. The three segments 226a-b, 228 of the back frame 224 define a back-receiving area 229. The foam back 222 can be positioned within the back-receiving area 229, for supporting a back of a passenger leaning on the seat back 220. In some examples, the foam back 222 is larger than the back receiving area and the back frame 224 is positioned in a groove 227 in the foam back 222 such that a portion of a load placed on the foam back 222 can be dissipated by the foam back 222 and another portion of the load can be dispersed through the back frame 224. In some examples, at least 50% of the load can be dissipated by the foam back 222.

The foam bottom 212, the foam back 222, or the foam body 232 can include a reinforcing structure 240 for providing more focused support. In some examples, the reinforcing structure 240 can include a series of ridges and gaps that can provide greater support for areas that are closer to the ridges than the gaps. Providing greater support for specific areas can include reducing the amount the specific areas yields under a load as compared to other areas. The gaps can reduce the weight of the seat assembly 200, while the ridges can provide the requisite support. In some examples, the foam back 222 can include the reinforcing structure 240, which provides additional support for an area associated with the lumbar region of a passenger seated in the seat assembly 200. In additional or alternative examples, the reinforcing structure 240 can be based on a typical weight distribution model for a user.

As depicted in FIGS. 5A-6B, the leg frame 234 can include four segments 236a-d positioned to define a leg-rest area 239. The foam body 232 can be positioned within the leg-rest area 239 for supporting the legs of a passenger seated in the seat assembly 200. In some examples, the foam body 232 is larger than the leg-rest area 239, and the leg frame 234 can be positioned in a groove 237 in the foam body 232. A portion of a load placed on the foam body 232 can be dissipated by the foam body 232 and another portion of the load can be dispersed through the leg frame 234. In some examples, at least 50% of the load can be dissipated by the foam body 232.

Figure 7A:
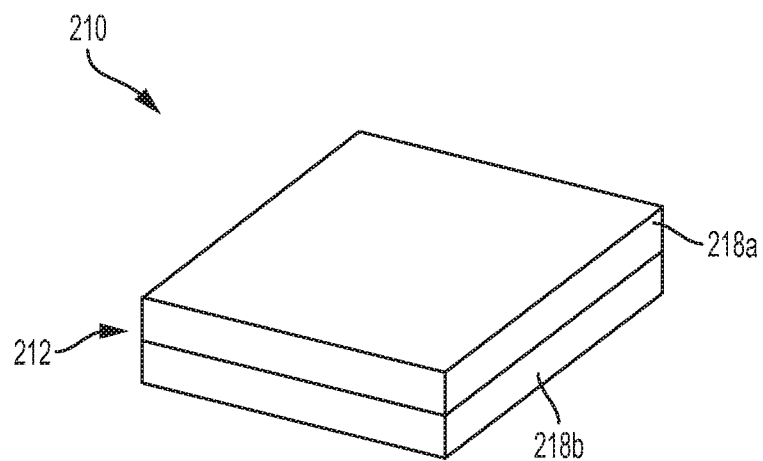
FIG. 7A is a perspective top view of an example of a seat bottom with a foam structural component according to one aspect of the present disclosure.
Figure 7B:
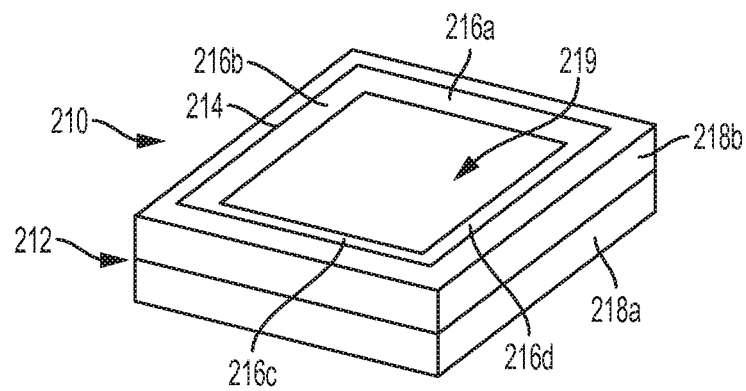
FIG. 7B is a perspective bottom view of an example of a seat bottom with a foam structural component according to one aspect of the present disclosure.
Figure 8:
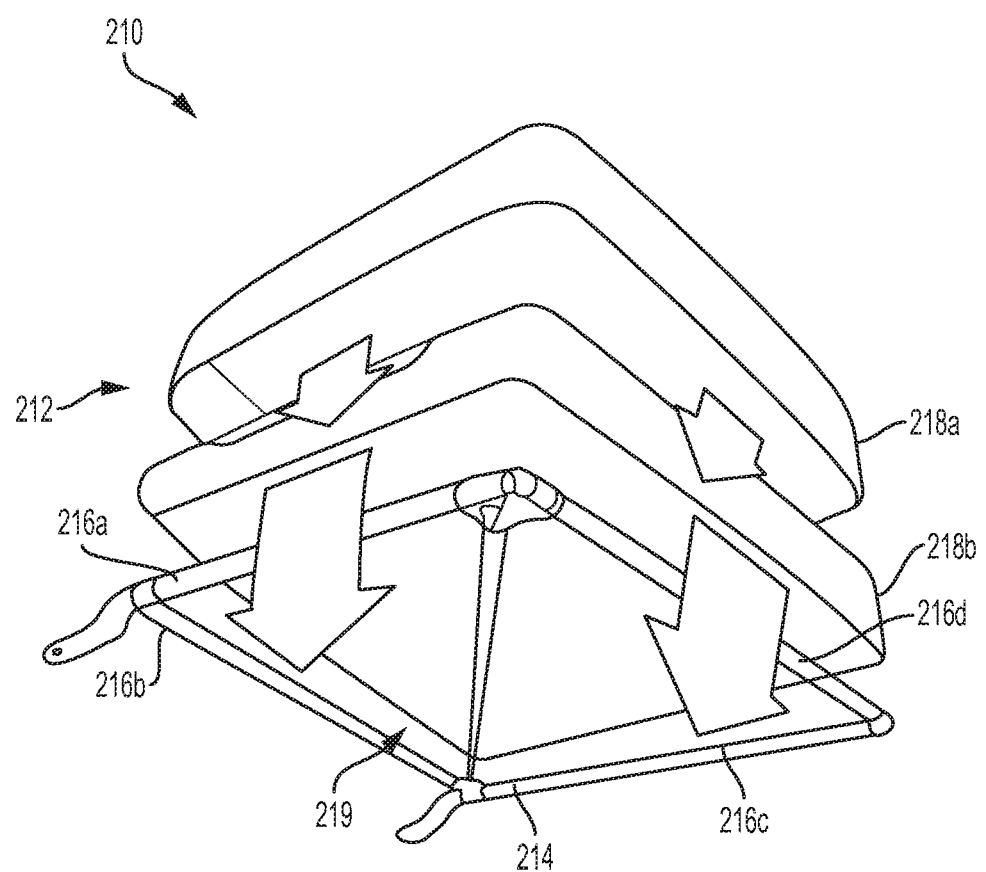
FIG. 8 is an exploded perspective bottom view of an example of a seat bottom with a foam structural component according to one aspect of the present disclosure.

As depicted in FIGS. 7A-8, the bottom frame 214 can include four segments 216a-d that define a sitting area 219. The foam bottom 212 can be positioned within the sitting area 219 for supporting a passenger seated in the seat assembly 200. In some examples, the foam bottom 212 can be larger than the sitting area 219 and the bottom frame 214 can be encompassed by the bottom foam 212. FIG. 8 is an exploded perspective bottom view of a seat bottom 210, in which the structural layer 218b encompasses the bottom frame 214. In some examples, the structural layer 218b can be molded around the bottom frame 214 during manufacturing. In some aspects, encompassing the bottom frame 214 by the structural layer 218b can include surrounding the bottom layer 214 with the structural layer 218b. In additional or alternative aspects, encompassing the bottom frame 214 can include partially surrounding the bottom frame 214, such that a portion of the bottom frame 214 is housed in the structural layer 218b. A portion of a load placed on the foam bottom 212 can be dissipated by the foam bottom 212 and another portion of the load can be dispersed through the bottom frame 214. In some examples, at least 50% of the load can be dissipated by the foam bottom 212.

Although only the foam bottom 212 is depicted as having a comfort layer 218a and a structural layer 218b, the foam back 222 and foam body 232 can have multiple layers as well. Both the comfort layer 218a and structural layer 218b can be generated using injection molding, machining, forming, or constructing. In some examples, both the comfort layer 218a and the structural layer 218b can be combined into a single foam component.

Constructing the seat bottom 210, the seat back 220, or the leg rest 230 can include assembling a frame 214, 224, 234. Constructing can further include generating a foam support 212, 222, 232 capable of supporting a load exerted on the foam support 212, 222, 232. Constructing can also include coupling the foam support 212, 222, 232 to the frame 214, 224, 234 to allow the foam support 212, 222, 232 to dissipate a portion of the load and disperse another portion of the load through the frame 214, 224, 234. In some examples, at least 50-60% of the load can be dissipated by the foam support 212, 222, 232. In some aspects, the foam bottom 212, foam back 222, and foam body 232 can replace existing metal or composite load-bearing components (e.g., bottom support 112, back support 122, or leg support 132) as well as separate cushions that can be positioned on top of the load-bearing components. For example, the foam back 222 can replace a back support 122 (e.g., a composite diaphragm) and an associated back cushion (not illustrated) in an existing seat, such as the seat assembly 100 shown in FIG. 1. Using a foam for structural components of a seat assembly 200 can reduce the weight of the seat assembly 200 as compare to a seat assembly 100 that uses metal structural components. In some examples, use of the foam for structural components can reduce the weight of a seat assembly 200 by 10-20%.

In the following, further examples are described to facilitate the understanding of the invention:

Example #1: A seat sub-assembly comprising: a frame; and a foam support coupleable to the frame for receiving a load on the seat sub-assembly, dissipating at least half of the load, and dispersing a portion of the load through the frame.

Example #2: The seat-sub assembly of any of the preceding or subsequent examples, wherein the seat sub-assembly is a seat back for a seat assembly on a passenger aircraft, wherein the frame includes a first segment and a second segment for extending from a seat bottom of the seat assembly, and a third segment for coupling the first segment and the second segment for defining a back-receiving area, wherein the foam support is positionable within the back-receiving area for supporting a back of a passenger sitting in the seat assembly, and wherein the load includes a weight of the passenger sitting in the seat assembly.

Example #3: The seat-sub assembly of any of the preceding or subsequent examples, wherein the seat sub-assembly is a seat bottom for a seat assembly on a passenger aircraft, wherein the frame includes four segments positioned to define a sitting area, wherein the foam support is positionable within the sitting area for supporting a passenger sitting in the seat assembly, and wherein the load includes a weight of the passenger sitting in the seat assembly.

Example #4: The seat-sub assembly of any of the preceding or subsequent examples, wherein the seat sub-assembly is a leg rest for a seat assembly on a passenger aircraft, wherein the frame includes four segments positioned to define a leg-rest area, wherein the foam support is positionable within the leg-rest area for supporting legs of a passenger sitting in the seat assembly, and wherein the load includes a weight of the passenger sitting in the seat assembly.

Example #5: The seat-sub assembly of any of the preceding or subsequent examples, wherein the foam support comprises: a foam structural layer for dissipating the load; a foam comfort layer coupled to the foam structural layer for providing a cushion; and a covering for encompassing the foam structural layer and the foam comfort layer to provide protection to the foam structural layer and the foam comfort layer.

Example #6: The seat-sub assembly of any of the preceding or subsequent examples, wherein the frame is encompassed by the foam structural layer.

Example #7: The seat-sub assembly of any of the preceding or subsequent examples, wherein the foam structural layer includes a reinforcing grid having a series of ridges and gaps such that the foam structural layer provides greater support to an area of the seat sub-assembly closer to the ridges than the gaps.

Example #8: The seat-sub assembly of any of the preceding or subsequent examples, wherein the foam structural layer can include at least one of neopor, polyolefin, ethylene-vinyl acetate ("EVA"), polyethylene, polyform, polyurethane, or ethafoam.

Example #9: The seat-sub assembly of any of the preceding or subsequent examples, wherein the foam support is a structural foam that is molded, machined, formed, or otherwise constructed to act as a load-bearing part of the seat sub-assembly.

Example #10: The seat-sub assembly of any of the preceding or subsequent examples, wherein foam is usable as a replacement for metal load-bearing components that support cushions.

Example #11: A seat assembly comprising: a seat pan comprising: a bottom frame; and a bottom support coupled to the bottom frame for bearing at least half of a first load on the seat assembly and dispersing a portion of the first load across the bottom support to the bottom frame; a seat back coupled to the seat pan, the seat back comprising: a back frame; and a back support coupled to the back frame for bearing at least half of a second load on the seat assembly and for dispersing a portion of the second load across the back support to the back frame; and a leg rest coupled to the seat pan, the seat pan comprising: a leg frame; and a leg support coupled to the leg frame for bearing at least half of a third load on the seat assembly and for dispersing a portion of the third load across the leg support to the leg frame, and wherein at least one of the bottom support, the back support, or the leg support includes a load-bearing foam.

Example #12: The seat assembly of any of the preceding or subsequent examples, wherein the seat assembly is a passenger seat on a passenger aircraft, wherein the first load, the second load, and the third load include a weight of a passenger sitting in the passenger seat.

Example #13: The seat assembly of any of the preceding or subsequent examples, wherein the load-bearing foam comprises: a foam structural layer for dissipating the first load, the second load, or the third load; a foam comfort layer coupled to the foam structural layer for providing a cushion; and a covering for encompassing the foam structural layer and the foam comfort layer to protect the foam structural layer and the foam comfort layer.

Example #14: The seat assembly of any of the preceding or subsequent examples, wherein at least one of the bottom frame, the back frame, or the leg frame is encompassed by the foam structural layer.

Example #15: The seat assembly of any of the preceding or subsequent examples, wherein the foam structural layer includes a reinforcing grid having a series of ridges and gaps such that the foam structural layer provides greater support to an area of the seat assembly closer to the ridges than the gaps.

Example #16: The seat assembly of any of the preceding or subsequent examples, wherein the foam structural layer can include at least one of neopor, polyolefin, ethylene-vinyl acetate ("EVA"), polyethylene, polyform, polyurethane, or ethafoam.

Example #17: The seat assembly of any of the preceding or subsequent examples, wherein the load-bearing foam is a structural foam that is molded, machined, formed, or constructed to act as a load-bearing part of the seat assembly.

Example #18: The seat assembly of any of the preceding or subsequent examples, wherein foam is usable as a replacement for metal load-bearing components that support cushions.

Example #19: A method comprising: assembling a frame for a component of a seat assembly; generating a foam support capable of supporting at least half of a load exertable on the component; and coupling the foam support to the frame to allow the foam support to disperse a portion of the load through the frame.

Example #20: The method of any of the preceding or subsequent examples, wherein the seat assembly is a passenger seat on a passenger aircraft, wherein generating the foam support comprises at least one of molding, machining, forming, or constructing a structural foam that includes a foam structural layer to act as a load-bearing part of the passenger seat and a foam comfort layer for providing a cushion to a passenger seated in the seat assembly.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A seat assembly comprising:
   a seat pan comprising:
      a bottom frame; and
      a bottom support coupled to the bottom frame for bearing at least half of a first load on the seat assembly and dispersing a portion of the first load across the bottom support to the bottom frame;
   a seat back coupled to the seat pan, the seat back comprising:
      a back frame; and
      a back support coupled to the back frame for bearing at least half of a second load on the seat assembly and for dispersing a portion of the second load across the back support to the back frame; and
   a leg rest coupled to the seat pan, the leg rest comprising:
      a leg frame; and
      a leg support coupled to the leg frame for bearing at least half of a third load on the seat assembly and for dispersing a portion of the third load across the leg support to the leg frame, and
   wherein the bottom support, the back support, and the leg support each include a load-bearing foam for receiving a corresponding load, dissipating at least half of the load, and dispersing a portion of the load through the corresponding frame,
   wherein the back frame defines a back-receiving area, wherein the foam of the back support is positioned within the back-receiving area, wherein the foam of the back support is larger than the back-receiving area, and wherein the back frame is positioned in a groove in the foam of the back support,
   wherein the leg frame defines a leg-rest area, wherein the foam of the leg support is positioned within the leg-rest area, wherein the foam of the leg support is larger than the leg-rest area, and wherein the leg frame is positioned in a groove in the foam of the leg support, and
   wherein the bottom frame comprises four frame segments defines a sitting area, wherein the foam of the bottom support is positioned within the sitting area, wherein the foam of the bottom support is larger than the sitting area, and wherein each of the four frame segments of the bottom frame are encompassed by the foam of the bottom support.

2. The seat assembly of claim 1, wherein the seat assembly is a passenger seat on a passenger aircraft, wherein the first load, the second load, and the third load include a weight of a passenger sitting in the passenger seat.

3. The seat assembly of claim 1, wherein the load-bearing foam comprises:
   a foam structural layer for dissipating the first load, the second load, or the third load;
   a foam comfort layer coupled to the foam structural layer for providing a cushion; and
   a covering for encompassing the foam structural layer and the foam comfort layer to protect the foam structural layer and the foam comfort layer.

4. The seat assembly of claim 3, wherein the foam structural layer includes a reinforcing grid having a series of ridges and gaps such that the foam structural layer provides greater support to an area of the seat assembly closer to the ridges than the gaps.

5. The seat assembly of claim 3, wherein the foam structural layer can include at least one of neopor, polyolefin, ethylene-vinyl acetate ("EVA"), polyethylene, polyform, polyurethane, or ethafoam.

6. The seat assembly of claim 1, wherein the load-bearing foam is a structural foam that is molded, machined, formed, or constructed to act as a load-bearing part of the seat assembly.

7. The seat assembly of claim 1, wherein foam is usable as a replacement for metal load-bearing components that support cushions.

* * * * *

UNITED STATES PATENT AND TRADEMARK OFFICE
CERTIFICATE OF CORRECTION

| | | |
|---|---|---|
| PATENT NO. | : 11,530,044 B2 | Page 1 of 1 |
| APPLICATION NO. | : 16/332580 | |
| DATED | : December 20, 2022 | |
| INVENTOR(S) | : Jason K. Smith, Raul G. Reyes and Andrew B. Severance | |

It is certified that error appears in the above-identified patent and that said Letters Patent is hereby corrected as shown below:

In the Claims

At Column 10, Line 2, replace:
"defines a sitting area, wherein the foam of the bottom"
With:
--defining a sitting area, wherein the foam of the bottom--

Signed and Sealed this
Seventh Day of February, 2023

Katherine Kelly Vidal
*Director of the United States Patent and Trademark Office*